United States Patent [19]
Hirai et al.

[11] Patent Number: 5,233,805
[45] Date of Patent: Aug. 10, 1993

[54] MOLDING FOR AUTOMOTIVE FRONT GLASS AND MOLDING APPARATUS

[75] Inventors: Yoichi Hirai, Oobu; Yukihiko Yada, Nagoya, both of Japan

[73] Assignee: Tokai Kogyo Kabushiki Kaisha, Aichi, Japan

[21] Appl. No.: 596,726

[22] Filed: Oct. 10, 1990

[30] Foreign Application Priority Data

Oct. 14, 1989 [JP] Japan .................................. 1-267802
Oct. 14, 1989 [JP] Japan .................................. 1-267803

[51] Int. Cl.$^5$ .......................... E04B 1/62; E04F 15/14
[52] U.S. Cl. ........................................ 52/400; 52/208; 52/397; 296/93
[58] Field of Search ................. 52/397, 400, 208, 401, 52/402, 403; 296/93, 208

[56] References Cited

U.S. PATENT DOCUMENTS

| | | | |
|---|---|---|---|
| 4,458,459 | 7/1984 | Irrgang | 52/400 X |
| 4,757,659 | 7/1988 | Miyakawa et al. | 52/400 |
| 4,757,660 | 7/1988 | Miyakawa et al. | 52/400 |
| 4,765,936 | 8/1988 | Ballocca . | |
| 4,833,847 | 5/1989 | Inayama et al. | 52/397 X |
| 4,865,796 | 9/1989 | Tamura et al. | 264/40.7 |
| 4,890,431 | 1/1990 | Katayama | 52/400 X |

FOREIGN PATENT DOCUMENTS

2049010 2/1980 United Kingdom .................. 52/400

Primary Examiner—Richard E. Chilcot, Jr.
Assistant Examiner—Kien Nguyen
Attorney, Agent, or Firm—Wenderoth, Lind & Ponack

[57] ABSTRACT

An automobile windshield molding is provided to be fitted in a gap formed between an automobile window frame and an automobile windshield. The molding includes an upper molding and opposing side moldings formed monolithically and continuously with the upper molding. The portions of the upper and side moldings which extend above the windshield are formed thicker for the side moldings than for the upper molding, in order to prevent sideways scattering of water incident on the windshield. The thickness of the side moldings decreases gradually toward the upper molding. The molding can be formed by a molding apparatus utilizing shutters which have predetermined shapes and which are linearly movable in order to increase or decrease the effective size of the extrusion opening to gradually change the thickness of the moldings during continuous molding of the upper and side moldings.

12 Claims, 10 Drawing Sheets

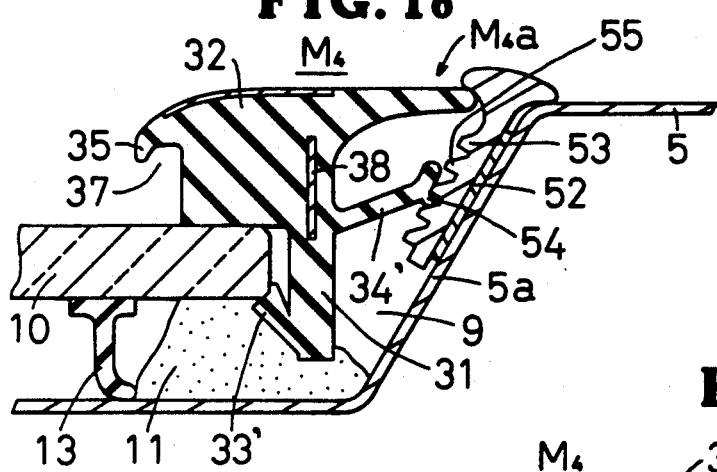
FIG. 18
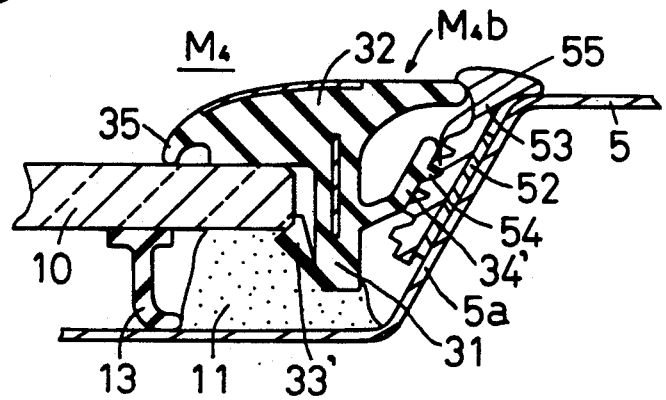
FIG. 19
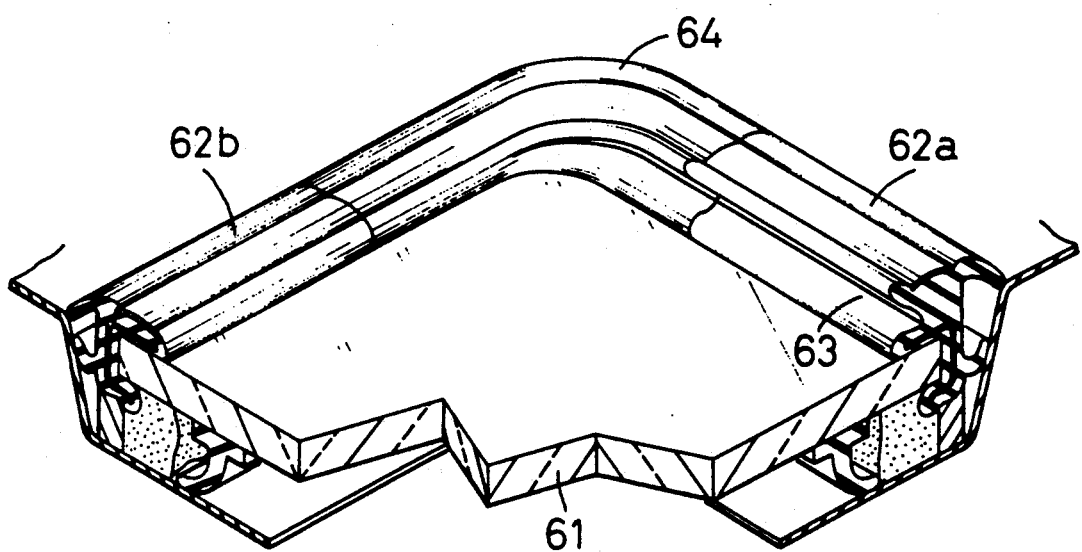
FIG. 20 — PRIOR ART

MOLDING FOR AUTOMOTIVE FRONT GLASS AND MOLDING APPARATUS

BACKGROUND OF THE INVENTION

1. Field of the Invention

The present invention relates to a molding for an automotive front glass (i.e. a windshield molding) and a molding apparatus therefor and more particularly to a molding to be fitted into the gap formed between the peripheral edge of an automotive front glass and a window frame of an automotive body in order to fill up the gap and simultaneously decorate the gap portion.

2. Prior Art

As shown in FIG. 20, a molding of the sort recently used for a front glass (hereinafter called simply the 'molding') is such that the side moldings 62a fitted to both sides of a front glass 61 are provided with rainwater guide grooves 63, respectively.

The rainwater guide grooves 63 are provided so as to prevent rainwater from sticking to the front glass 61 during traveling and then scattering and hence penetrating into the driver's seat and also to prevent the visibility range from being obstructed by the rainwater sticking to the front glass 61.

However, since the side molding 62a fitted with the rainwater guide groove 63 is not usable in the upper portion of the front glass 61, an additional upper molding 62b without such a rainwater guide groove 63 is fabricated and coupled to the side moldings 62a by means of corner joints 64. As a result, the conventional molding has been composed of five parts: two side moldings 62a, one upper molding 62b and two corner joints 64.

Consequently, the conventional construction stated above results in an increased number of parts and thus an increase in the amount of labor for assembly, thereby increasing production costs. Moreover, as it is hard to make luster and color tones of the corner joints 64 strictly harmonize with those of the side and upper moldings 62a, 62b, the external appearance deteriorates as the junctions become easily recognizable. In addition, there is formed a gap between the corner joint 64 and each of the moldings 62a, 62b and the gaps tend to allow damage to develop.

SUMMARY OF THE INVENTION

A molding according to the present invention is characterized in that side moldings to be fitted to the respective side edges of a front glass and an upper molding to be fitted to the upper edge thereof are made continuous by monolithic molding; the wall thickness of the side molding is made greater than that of the upper molding to the extent that rainwater sticking to the front glass can be prevented from scattering sideways; and the wall thickness of the ornamental portion of the side molding in each corner portion of the molding is gradually made smaller toward the upper molding. In this molding, a groove lip is projected inwardly toward the upper end of the ornamental portion and a rainwater guide groove is formed between the groove lip thus projected from the ornamental portion of the side molding and the front glass, whereas the groove lip projected is caused to resiliently contact the front glass so as to not form a rainwater guide groove in the ornamental portion of the upper molding, whereby the rainwater is effectively prevented from scattering because of the function of the rainwater guide groove. When the rainwater guide groove is provided in the upper molding, the wall thickness of the ornamental portion thereof can be made smaller.

With the molding according to the present invention, the gap formed between the peripheral edge of the front glass and the window frame of the body is closed by one continuous molding as the side and upper moldings are monolithically molded. Consequently, no junctions are necessary in the corner portions of the molding because corner joints can be dispensed with and its external appearance as well as its strength is thus improved. Moreover, the number of parts to be molded is decreased to one and this results in not only a decrease in the amount of labor for assembly but also in a reduction in cost.

BRIEF DESCRIPTION OF THE DRAWINGS

FIGS. 1 to 19 illustrate the present invention:

FIG. 1 is a perspective view of an automobile equipped with a molding $M_1$;

FIG. 2 is an enlarged perspective view of a portion shown by C of FIG. 1;

FIGS. 3 and 4 are enlarged sectional views taken on lines $X_1-X_1$ and $X_2-X_2$ of FIG. 2, respectively;

FIGS. 5 and 6 are elevational views illustrating molding conditions of a side molding $M_1a$ and an upper molding $M_1b$ using a molding apparatus for the molding $M_1$;

FIG. 7 is an exemplary diagram for explaining a continuous molding of the side molding $M_1a$ and the upper molding $M_1b$ using the molding apparatus;

FIG. 8 is a detailed exemplary diagram of FIG. 7;

FIG. 9 is a partial enlarged perspective view of the corner portion of a molding $M_2$;

FIGS. 10 and 11 are enlarged sectional views taken on lines $Y_1-Y_1$ and $Y_2-Y_2$ of FIG. 9, respectively;

FIG. 12 is an elevational view of a molding apparatus for the molding $M_2$;

FIG. 13 is a partial enlarged sectional view of the corner portion of a molding $M_3$;

FIGS. 14 and 15 are enlarged sectional views taken on lines $Z_1-Z_1$ and $Z_2-Z_2$ of FIG. 13, respectively;

FIGS. 16 and 17 are elevational views illustrating molding conditions of a side molding $M_3a$ and an upper molding $M_3b$ using a molding apparatus for the molding $M_3$; and FIGS. 18 and 19 are sectional views of a side molding $M_4a$ and an upper molding $M_4b$ of a molding $M_4$;

FIG. 20 is a partial perspective view of the corner portion of a conventional molding.

DETAILED DESCRIPTION OF THE INVENTION

Figure 1:
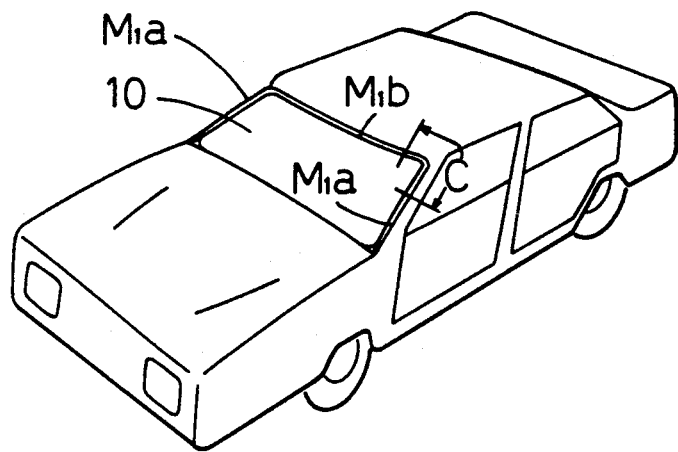

FIGS. 1 to 8, inclusive, show a molding $M_1$ and a molding apparatus embodying the present invention.

The molding $M_1$ is a combination of side moldings $M_1a$ and an upper molding $M_1b$ that have been molded by a molding apparatus monolithically and continuously, the side moldings being fitted to peripheral edges on both sides of a front glass 10, the upper molding being fitted to the upper edge thereof.

Each of the side and upper moldings $M_1a$, $M_1b$ is composed of an ornamental portion 2 with a groove lip 1 projecting inwardly at its upper end and a clip fitting portion 3 formed by bending a thin metal sheet and secured to the outside face of the ornamental portion 2. However, the wall thickness $T_1a$ of the ornamental portion 2 of the side molding $M_1a$ is made far greater than the wall thickness $T_1b$ of the ornamental portion 2 of the upper molding $M_1b$ (see FIGS. 3 and 4). A small lip 4 is secured to the outside of the clip fitting portion 3, the small lip 4 and the ornamental portion 2 being molded out of elastic material such as rubber.

Figure 3:
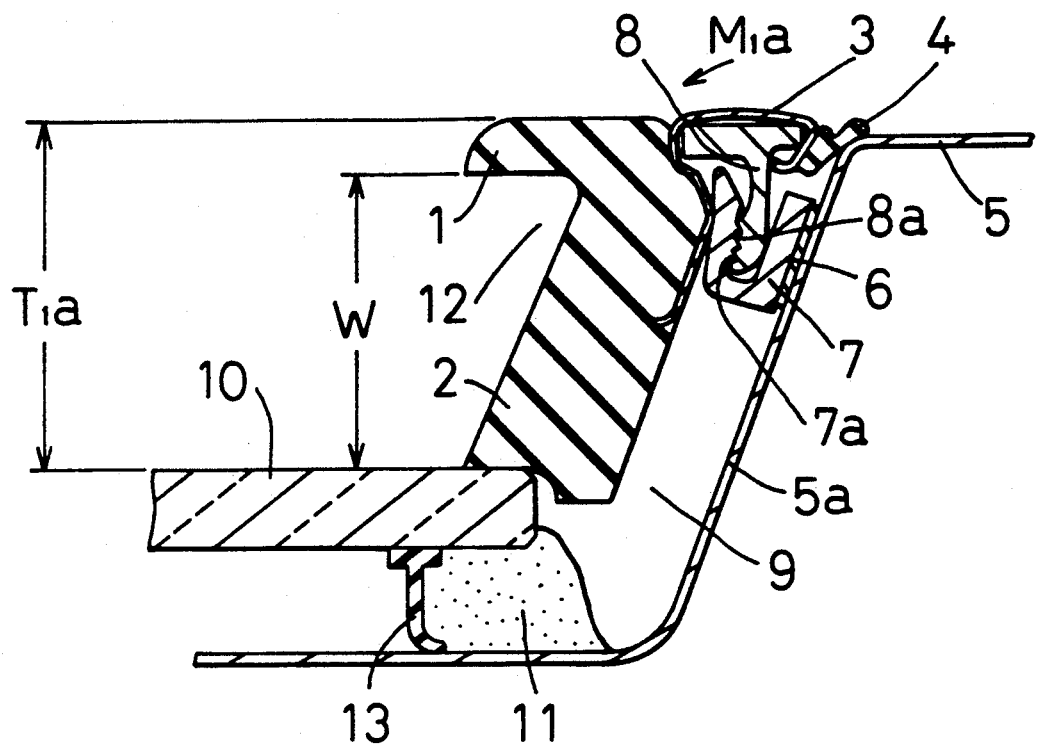
Figure 4:
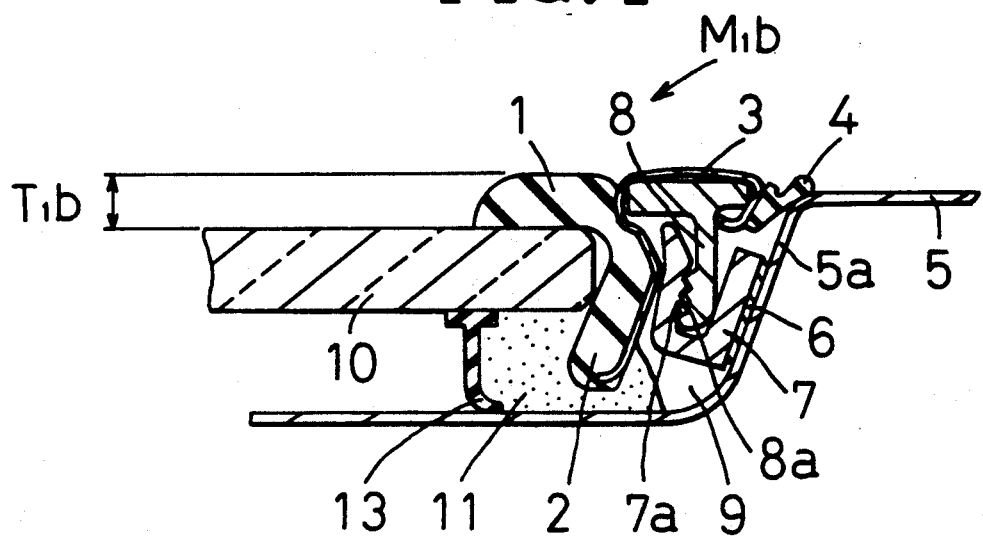

As shown in FIGS. 3 and 4, U-shaped clip mating pieces 7 are secured via a double-sided tape 6 to the tilted portion 5a of a body panel 5 at predetermined intervals. T-shaped clips 8 are fitted to the clip fitting portion 3 forming the molding $M_1$ at predetermined intervals. The clip mating pieces 7 and the clips 8 are provided with mating teeth 7a, 8a formed thereon, respectively.

Figure 2:
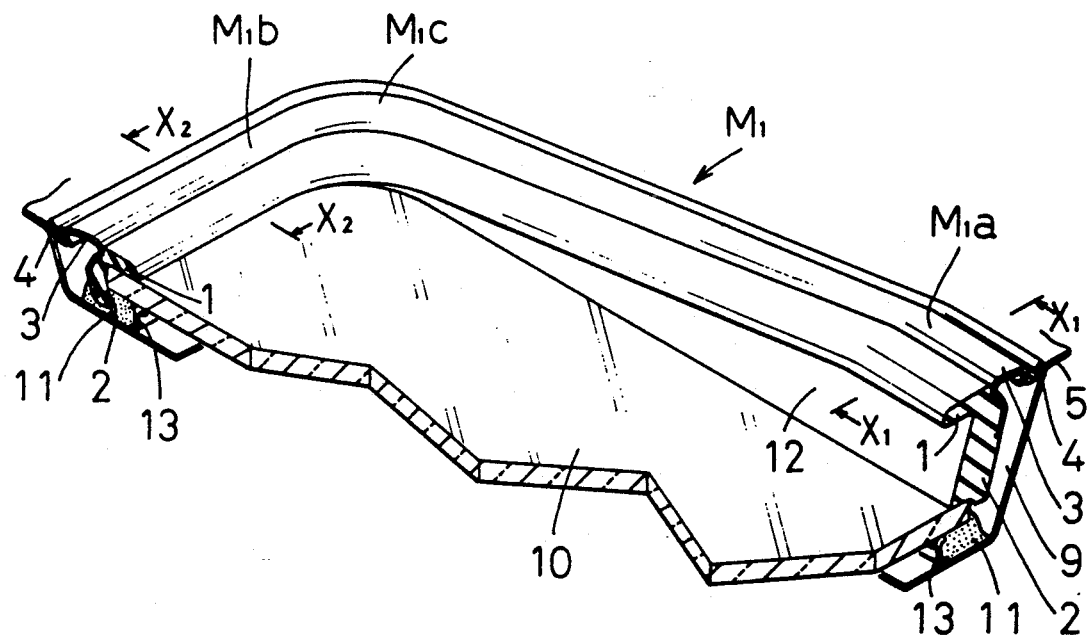

To fit the molding $M_1$ into the gap 9 formed between the window frame of the body and the peripheral edge of the front glass 10, the front glass 10 is first secured via a sealant 11 to the body panel 5 of the window frame. When the molding $M_1$ is subsequently forced into the gap 9, the mating teeth 8a of the clip 8 fitted to the molding $M_1$ and the mating teeth 7a of the clip mating piece 7 fitted thereto mate with each other as shown in FIGS. 2 to 4. Then the lower end face of the ornamental portion 2 of the side molding $M_1a$ resiliently contacts the surface of the front glass and simultaneously the inwardly projecting groove lip 1 of the ornamental portion 2 of the upper molding $M_1b$ resiliently contacts the surface of the front glass 10, whereby the gap 9 is filled up (or closed) as the molding $M_1$ is fitted into the gap 9.

A rainwater guide groove 12 is formed between the groove lip 1 projected inwardly at the upper end of the ornamental portion 2 and the surface of the front glass 10 in the side moldings $M_1a$. However, such a rainwater guide groove 12 is not formed in the upper molding $M_1b$ as the groove lip 1 resiliently contacts the surface of the front glass 10. In a corner portion $M_1c$ forming the junction between the side molding $M_1a$ and the upper molding $M_1b$, the wall thickness of the ornamental portion 2 of the side molding $M_1a$ is made gradually smaller toward the upper molding $M_1b$, whereas the width W (see FIG. 3) of the rainwater guide groove 12 is made gradually smaller so that the guide groove disappears where it joins the upper molding $M_1b$. In FIGS. 2 to 4, numeral 13 denotes dam rubber for preventing the sealant 11 from flowing out.

The molding apparatus for the molding $M_1$ will be described with reference to FIGS. 5 and 6.

A molding die 14 is provided with an extrusion molding port 15 substantially corresponding in configuration to the section of the side molding $M_1a$. A first and a second shutter 16, 17 are provided in the front portion of the die 14 in such a way as to partially cover the extrusion molding port 15. The first shutter 16 is linearly movable along the direction P corresponding to the wall thickness of an opening 15a for extruding the ornamental portion 2 of the molding $M_1$ out of the extrusion molding port 15. The second shutter 17 is linearly movable along the direction Q of an opening 15b for extruding the groove lip 1 of the molding $M_1$ out of the extrusion molding port. The shutters 16, 17 are arranged so that they are respectively linearly guided by the shutter guides 18, 19. The shutters 16, 17 are also equipped with drive motors 21, 22 and conversion mechanisms 23, 24 for converting rotational movements to linear movements, respectively.

Figure 5:
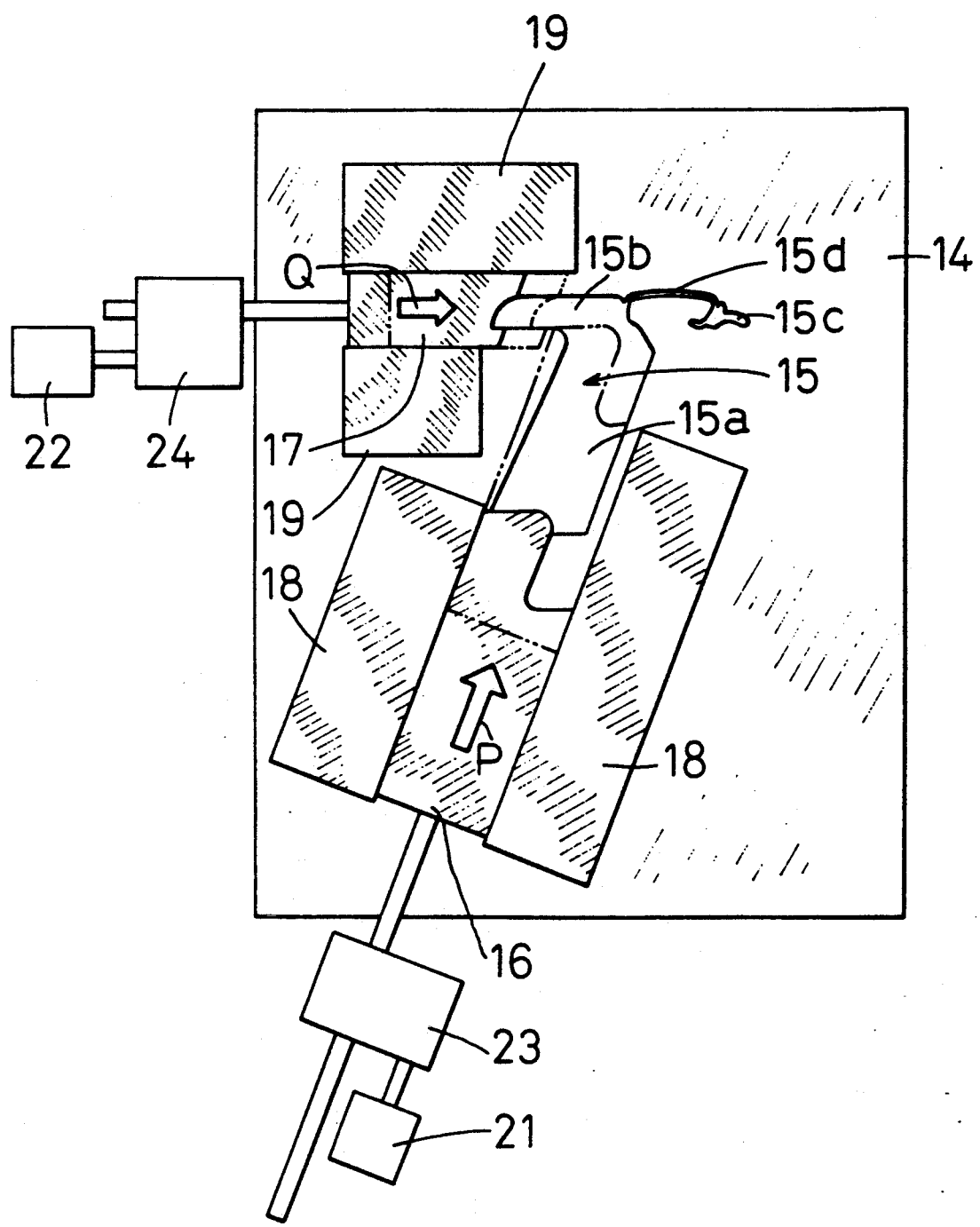
Figure 6:
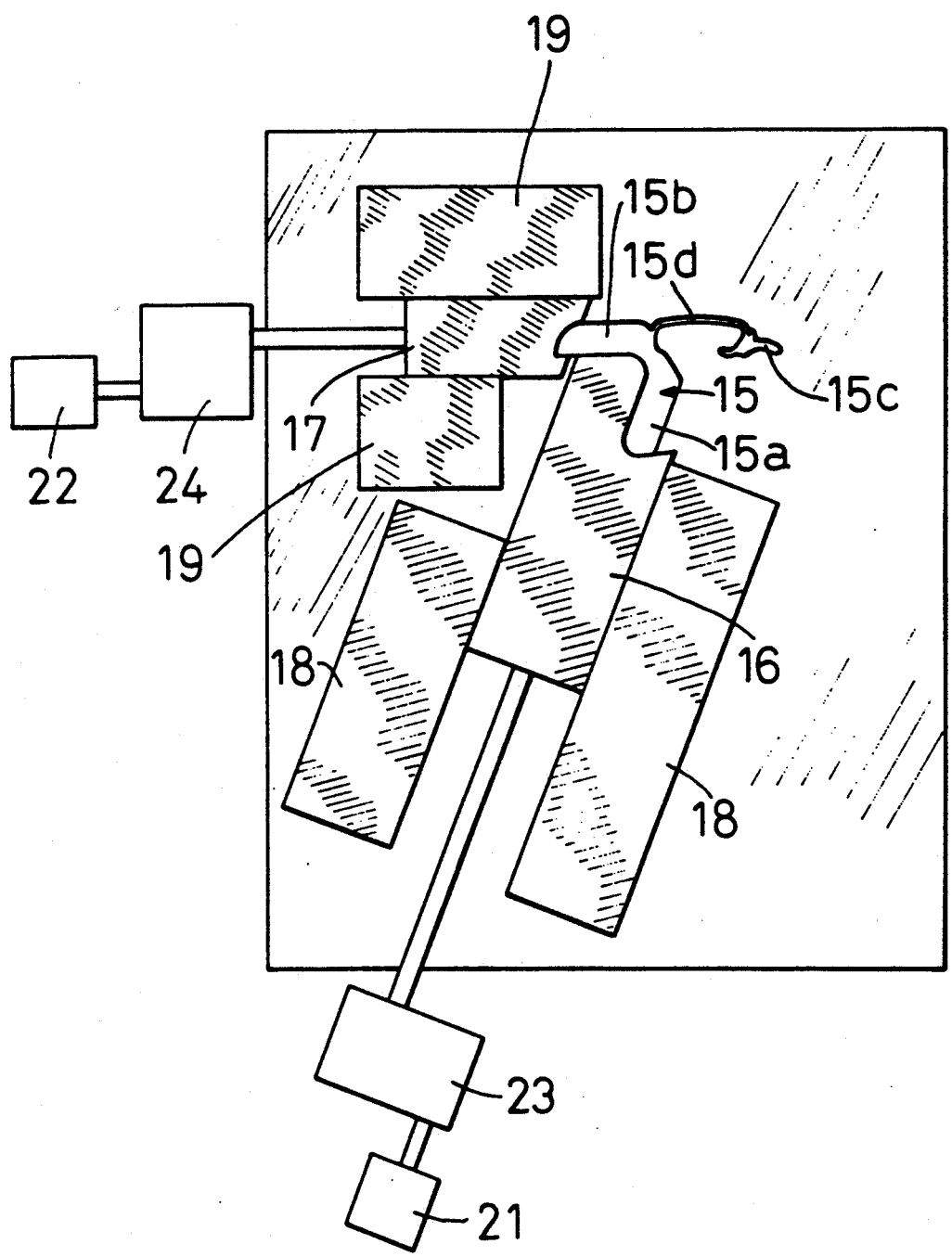

In FIGS. 5 and 6, numeral 15c refers to an opening for extruding the small lip 4, and 15d to an opening (slit) for passing therethrough the metal sheet for molding the clip fitting portion 3.

The effective extrusion opening for the side molding $M_1a$ is shown by a continuous line in FIG. 5, whereas the effective extrusion for the upper molding $M_1b$ is shown by a two-dot chain line in FIG. 5 and a continuous line in FIG. 6.

Figure 7:
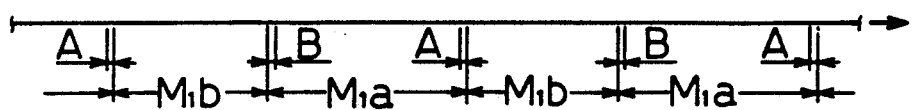
Figure 8:
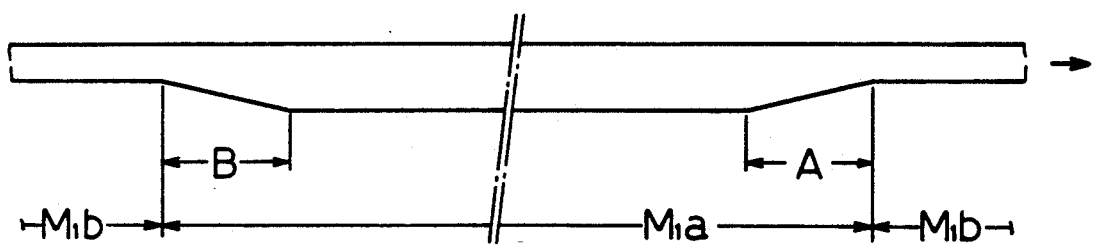

In order to transfer from the process of molding the side molding $M_1a$ to that of molding the upper molding $M_1b$, as exemplified in FIGS. 7 and 8 (A denotes the transfer portion in FIGS. 7 and 8), the first and the second shutters 16, 17 are gradually linearly moved from the state shown in FIG. 5 in the directions of arrows P and Q, respectively. The wall thickness of the ornamental portion 2 is thus made gradually smaller, whereas the projected length of the groove lip 1 is gradually decreased, whereby transfer to the molding process of the upper molding $M_1b$ is accomplished.

On the other hand, to transfer from the process of molding the upper molding $M_1b$ to that of molding the side molding $M_1a$ (B denotes the transfer portion in FIGS. 7 and 8), the first and the second shutters 16, 17 in the state of FIG. 6 are gradually linearly moved in the directions opposite to the arrows P and Q, respectively. The wall thickness of the ornamental portion, 2 is thus made gradually greater and when the first shutter 16 reaches the end of its retraction, the ornamental portion 2 having a constant wall thickness is formed, whereas the projected length of the groove lip 1 is gradually increased, whereby when the second shutter 17 reaches the end of its retraction, the groove lip 1 having a constant projected length is formed.

FIGS. 9 to 12, inclusive, show another molding $M_2$ and its molding apparatus embodying the present invention, wherein like reference characters designate like or corresponding parts of the molding $M_1$.

The molding $M_2$ is constructed so that rainwater sticking to the front glass 10 is prevented from scattering sideways by merely increasing the wall thickness of the ornamental portion 2. No groove lip 1 is provided in the ornamental portion 2 as in the case of the molding $M_1$.

More specifically, the clip fitting portion 3 formed by bending the metal sheet is secured to the outer face of the upper end portion of the ornamental portion 2 in such a manner that it is embedded therein in a side molding $M_2a$, whereas the small lip 4 and the ornamental portion 2 are monolithically molded. The molding $M_2$ is fitted into the gap between the peripheral edge of the front glass 10 and the window frame by mating a clip 8' inserted in the clip fitting portion 3 with the clip mating piece 7 secured to the body panel 5 of the window frame. In the side molding $M_2a$, moreover, the wall thickness $T_2a$ of the ornamental portion 2 is much greater than the wall thickness $T_2b$ of the ornamental portion 2 of an upper molding $M_2b$. The wall thickness $T_2b$ of the ornamental portion 2 of the side molding $T_2a$ is made great enough to prevent rainwater on the front glass 10 from scattering sideways. Rainwater can be prevented from scattering, if the wall thickness is greater than 8 mm.

Figure 9:
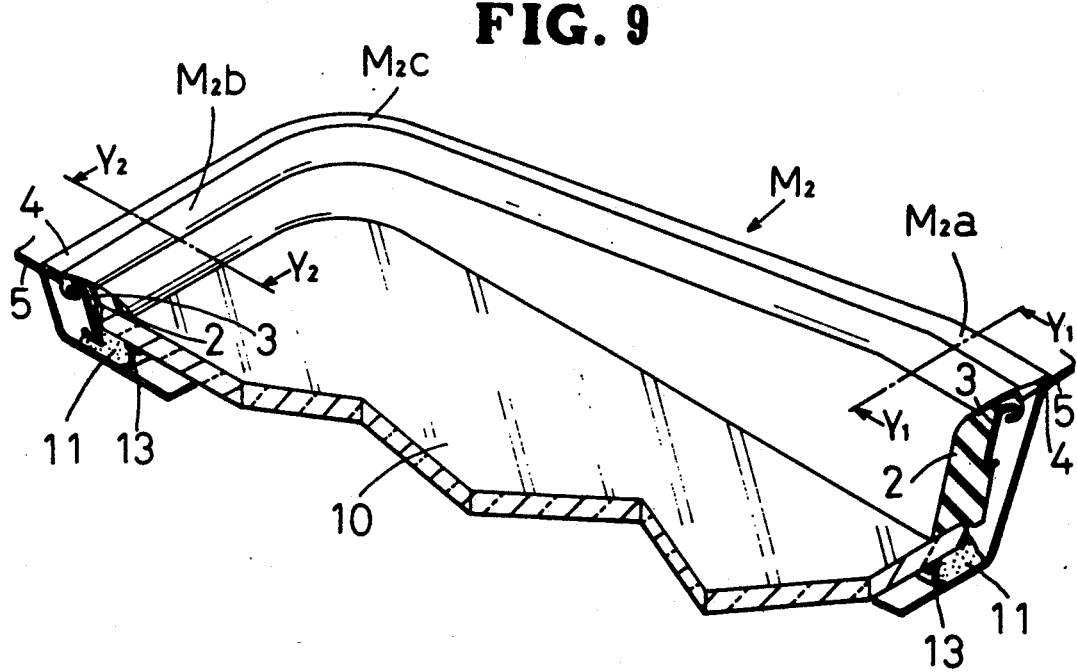
Figure 10:
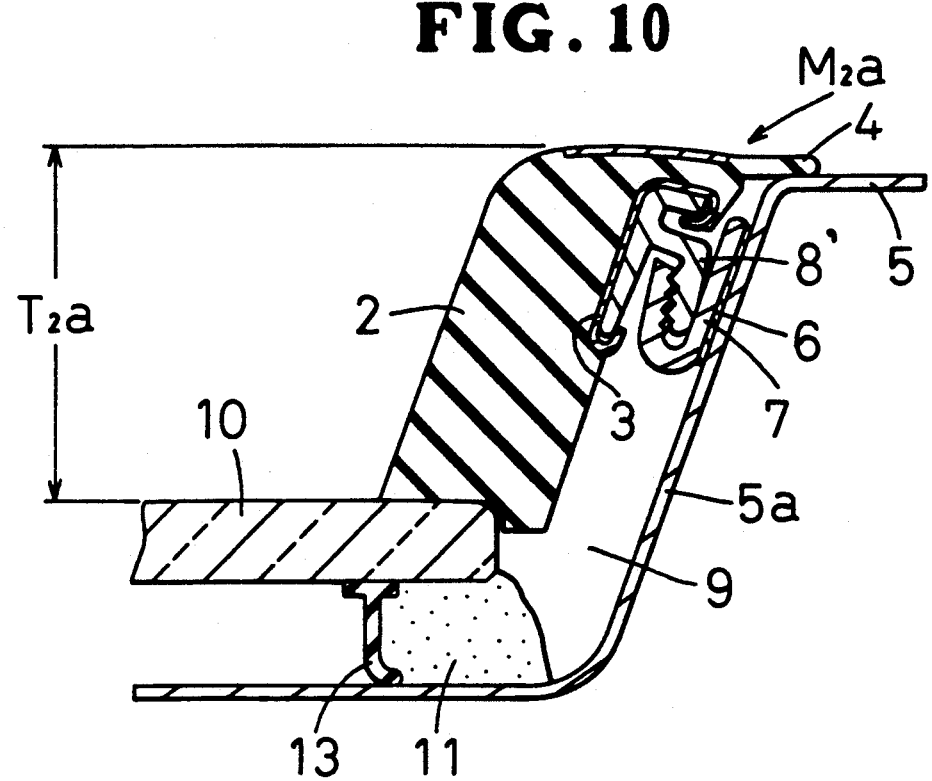
Figure 11:
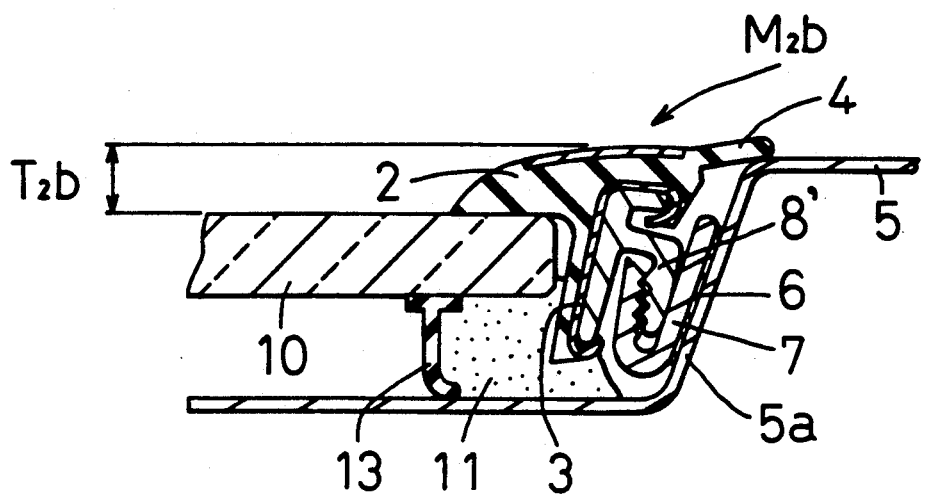

As shown in FIG. 9, the wall thickness of the ornamental portion 2 of the side molding $M_2a$ is made gradually smaller toward the upper molding $M_2b$ in the corner portion $M_2C$ of the molding $M_2$, whereby the side molding $M_2a$ and the upper molding $M_2b$ are made consecutive and continuous.

Figure 12:
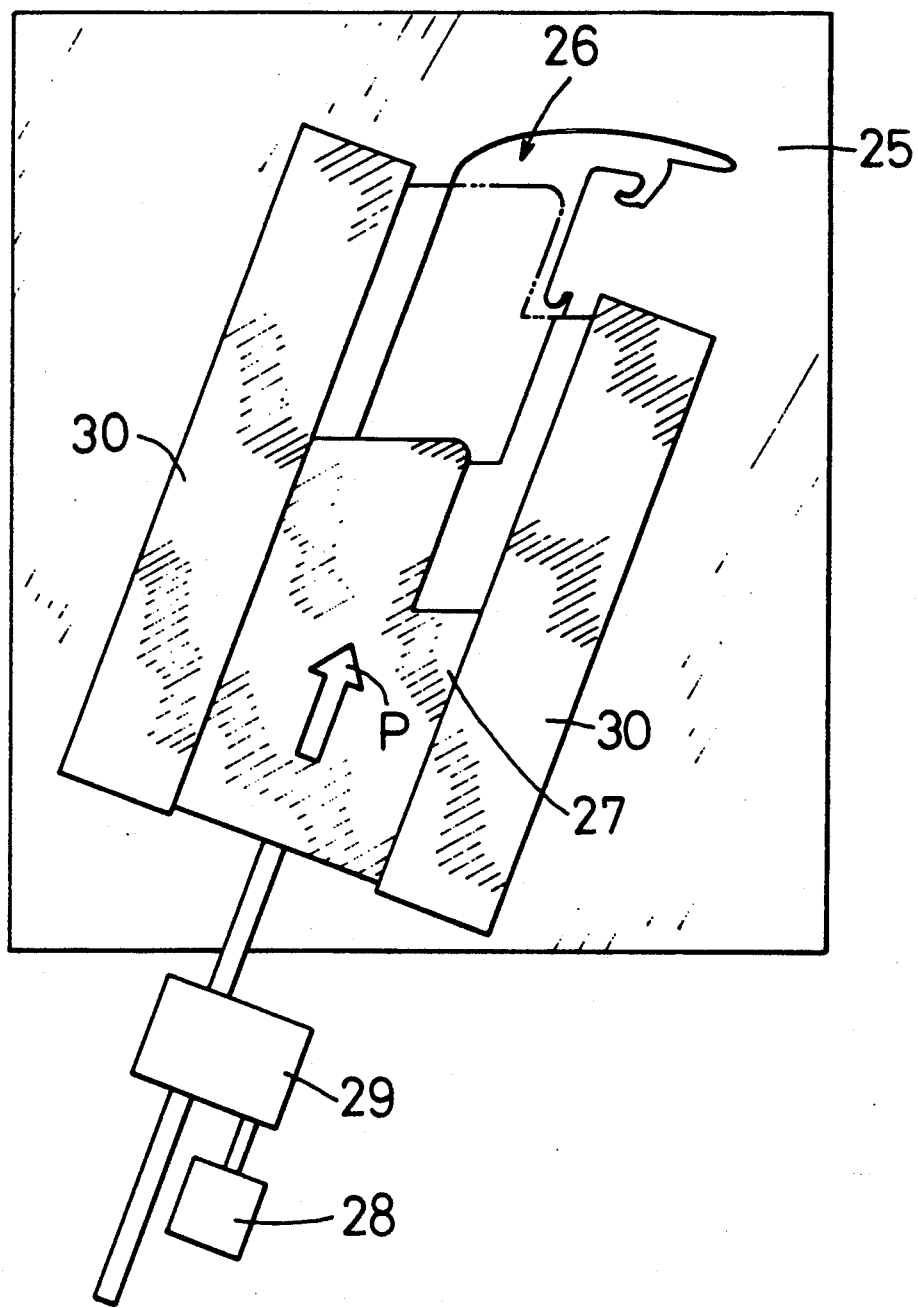

FIG. 12 is an elevational view of the molding apparatus for the molding $M_2$, wherein a molding die 25 is provided with an extrusion molding port 26 substantially corresponding in configuration to the section of the side molding $M_{2}a$. The molding die 25 is formed with a shutter 27 for varying the wall thickness of the ornamental portion 2 of the molding $M_2$ by means of a drive motor 28 and a conversion mechanism 29 for converting rotational movement to linear movement, the shutter 27 being linearly movable along the direction P corresponding to the wall thickness of the ornamental portion 2. The positions of the shutter 27 shown by a continuous line and a two-dot chain line refer to the positions thereof for extruding the side molding $M_{2}a$ and the upper molding $M_{2}b$, respectively. Numeral 30 in FIG. 12 denotes a shutter guide for guiding the linear movement of the shutter 27.

FIGS. 13 to 17, inclusive, show still another molding $M_3$ and its molding apparatus embodying the present invention.

Each of the side and upper moldings $M_{3}a$, $M_{3}b$ comprises a leg portion 31 and an ornamental portion 32 monolithically molded at the upper end of the leg portion 31. However, the wall thicknesses $T_{3}a$, $T_{3}b$ of the respective ornamental portions 32 differ from each other (see FIGS. 14 and 15). The leg portion 31 of the side molding $M_{3}a$ and that of the upper molding $M_{3}b$ are fitted into the gap formed between the peripheral edge of the front glass 10 and the body panel 5 of the window frame, whereas the ornamental portions 32 cover the gap 9.

Figure 14:
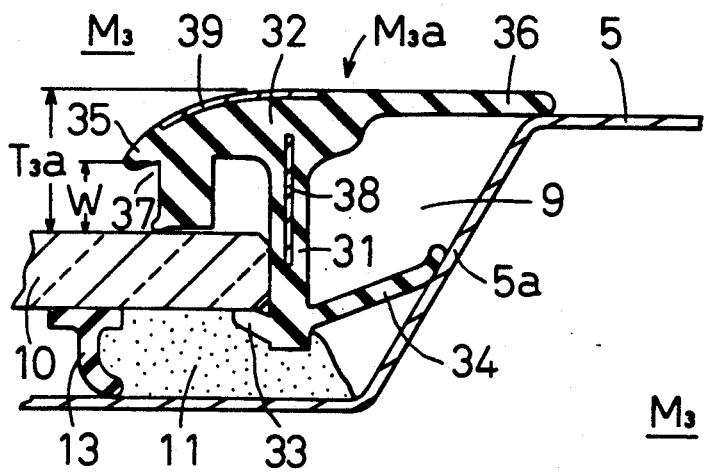
Figure 15:
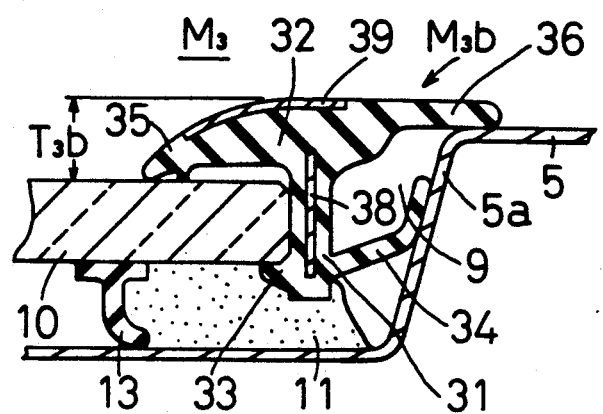

As shown in FIGS. 14 and 15, a holding lip 33 is projected from the inside of the lower end of the leg portion 31 of the side molding $M_{3}a$, whereas a panel lip 34 is projected from the outside thereof. A groove lip 35 is projected from the inside of the ornamental portion 32, whereas an ornamental lip 36 is projected from the outside thereof. With the ornamental portion 32 located to the inside of the leg portion 31 and the holding lip 33, the side molding $M_{3}a$ is held and fitted against the side of the front glass 10. The panel lip 34 resiliently contacts the tilted portion $5a$ of the body panel 5, whereas the ornamental lip 36 resiliently contacts the upper face of the body panel 5. Moreover, a rainwater guide groove 37 is formed between the surfaces of the front glass 10 and the groove lip 35. As shown in FIGS. 14 and 15, the wall thickness $T_{3}b$ of the ornamental portion 32 of the upper molding $M_{3}b$ is smaller than that of the side molding $M_{3}a$. The groove lip 35 of the upper molding $M_{3}b$ resiliently contacts the upper face of the front glass 10. Such that no rainwater guide groove 37 is formed between the front glass 10 and the groove lip 35 of the upper molding $M_{3}b$. The upper molding $M_{3}b$ includes the holding lip 33 and the panel lip 34 in a like manner to the side molding $M_{3}a$, as shown in FIG. 15. With the holding lip 33 and the ornamental portion 32, the upper molding $M_{3}b$ is held at the peripheral edge of the front glass 10.

Figure 13:
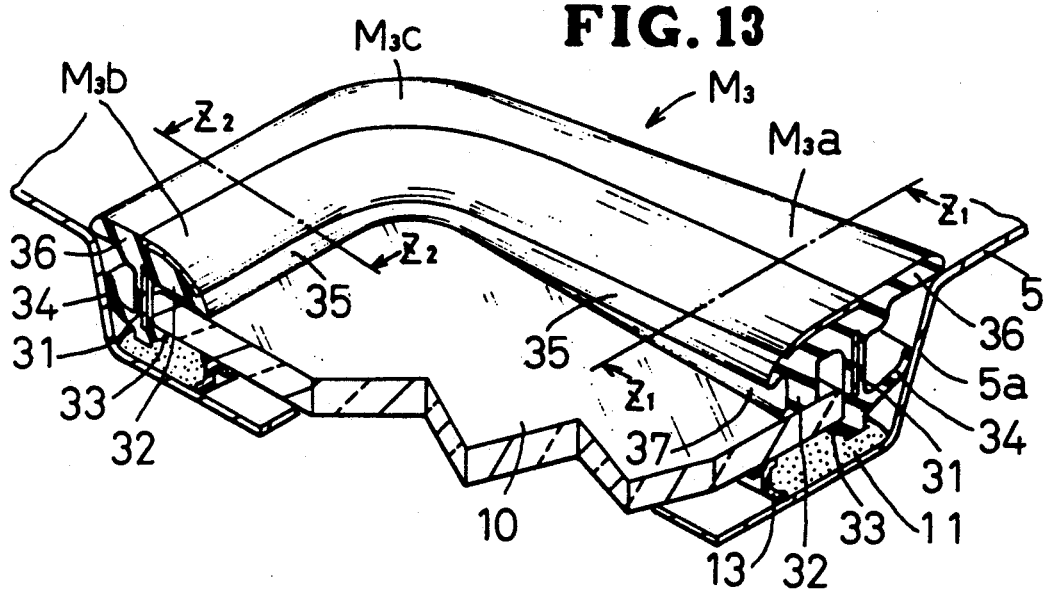

As shown in FIG. 13, the wall thickness of the ornamental portion 32 of the side molding $M_{3}a$ is made gradually smaller toward the upper molding $M_{3}b$ in the corner portion $M_{3}c$ of the molding $M_3$. The width of the ornamental portion 32 is simultaneously made gradually smaller toward the upper molding $M_{3}b$. For this reason, the rainwater guide groove 37 is made gradually narrower and disappears when it joins the upper molding $M_{3}b$.

The molding $M_3$ may be inserted in the window frame while fitted with the front glass 10 or it may otherwise be inserted after the front glass 10 is inserted in the window frame. In either case, the molding $M_3$ can be inserted stably in the window frame since the panel lip 34 is arranged so as to resiliently contact the tilted portion $5a$ of the body panel 5.

A reinforcing core material 38 is embedded in the leg portion 31 of the molding $M_3$, and an ornamental tape 39 is bonded to the upper face of the ornamental portion 32.

The molding apparatus for the molding $M_3$ will be described with reference to FIGS. 16 and 17.

A molding die 41 is provided with an extrusion molding port 42 substantially corresponding to the section of the side molding $M_{3}a$. A first and a second shutter 43, 44 are provided in the front portion of the molding die 41 in such a way as to partially cover the extrusion molding port 42. The first shutter 43 is fitted so that it is linearly movable along the longitudinal direction of an opening $42a$ for extruding the leg portion 31 of the molding $M_3$ out of the extrusion molding port 42, whereas the second shutter 44 is fitted so that it is linearly movable along the longitudinal direction of an opening $42b$ for extruding the ornamental lip 39 of the molding $M_3$ out of the extrusion molding port 42. The shutters 43, 44 are linearly guided by respective shutter guides 45, 46 and are provided with drive motors 47, 48 and conversion mechanisms 49, 51 for converting rotational movements to linear movements, respectively. In this case, each of the openings $42c$, $42d$ for molding the holding lip 33 and the panel lip 34 is formed in the first shutter 43.

Figure 16:
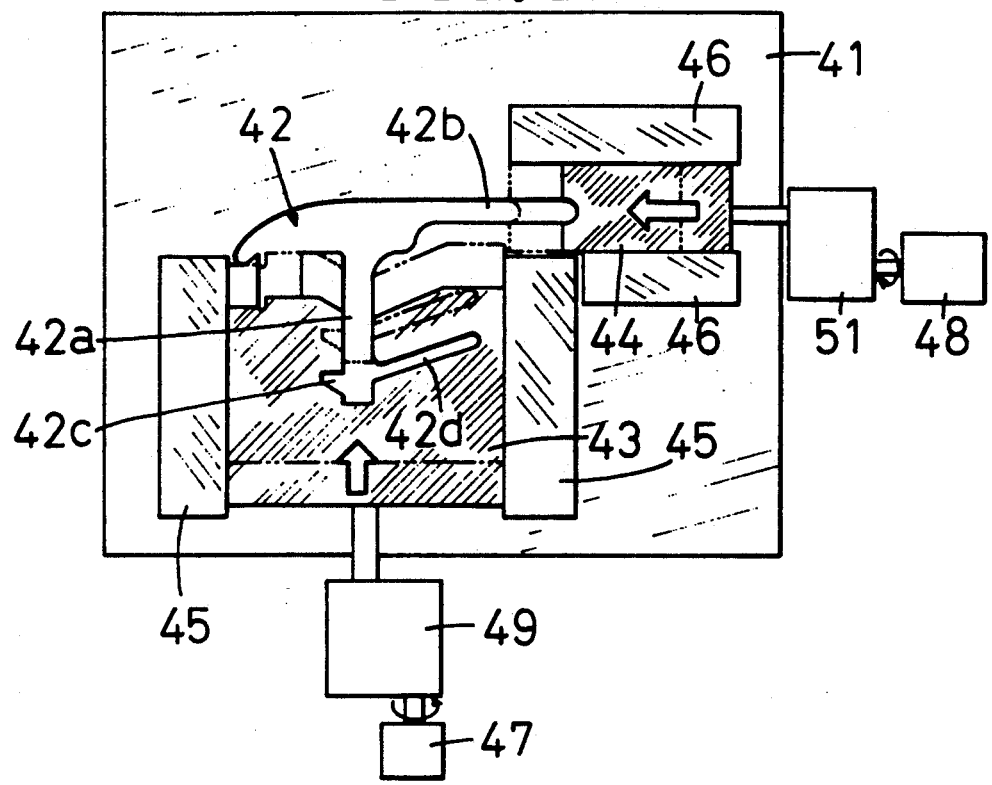
Figure 17:
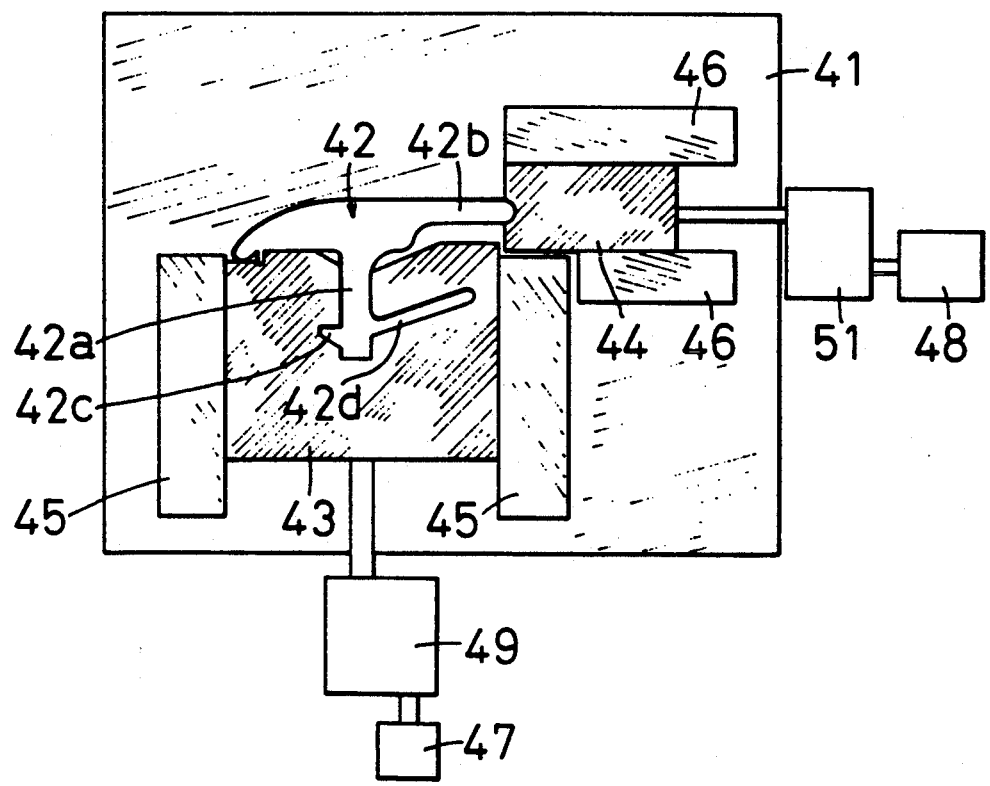

The positions of the shutter for extruding the side molding $M_{3}a$ are shown by a continuous line in FIG. 16, whereas the positions of the shutter for extruding the upper molding $M_{3}b$ are shown by a two-dot chain line in FIG. 16 and a continuous line in FIG. 17. When the corner portion of the molding $M_3$ is molded, the first and the second shutter 43, 44 are linearly moved in the predetermined direction as stated above to change the configuration of the extrusion molding port 42.

FIGS. 18 and 19 show still another molding $M_4$ embodying the present invention. A description will subsequently be given of only what is different from the molding $M_3$ described above.

The molding $M_4$ is fitted into the gap formed between the front glass 10 and a fastener 53 secured via a double-sided tape 52 to the inside of the tilted portion $5a$ of the body panel 5. A holding lip 33' is projected inwardly from the lower end of the leg portion 31 of the molding $M_4$, whereas a panel lip 34' is projected outwardly from the opposite side of the holding lip 33'. A projection 54 is provided at the leading end of the panel lip 34'. When the panel lip 34' is made to resiliently contact the fastener 53, the projection 54 extended from the panel lip 34' engages with a rugged portion 55 of the fastener 53, whereby the molding $M_4$ is prevented from slipping out.

Referring now in general to all of the above-described embodiments, the molding according to the present invention can be generally defined as having an upper molding and side moldings, each of which includes a leg portion which is disposed outwardly of and along the peripheral edge of the windshield and a head portion which extends inwardly from the leg portion and overlies the windshield (see especially FIGS. 3, 4, 10, 11, 14, 15, 18 and 19). As shown in these figures, the head portions of the side moldings (see FIGS. 3, 10, 14 and 18) are greater in thickness than the head portion of the upper molding (see FIGS. 4, 11, 15 and 19), and the thickness of the side molding head portions decreases toward the upper molding. The head portions of the side moldings and upper molding respectively have contacting surfaces which, as shown in FIGS. 2-4, 9-11, 13-15, 18 and 19, contact the exterior surface of the windshield. As shown best in FIGS. 2, 9, and 13, the contacting surface of the head portion of the upper molding runs continuous with the contacting surfaces of the head portions of the side moldings so as to define a single continuous surface contacting the exterior surface of the windshield.

What is claimed is:

1. An automobile windshield molding adapted to be fitted in a gap formed between an automobile window frame and an automobile windshield, comprising:

side moldings adapted to be fitted in the gap between the window frame and the windshield along opposing peripheral side edges of the windshield;

an upper molding adapted to be fitted in the gap between the window frame and the windshield along a peripheral upper edge of the windshield, said upper molding being monolithically and continuously formed with said side moldings;

wherein each of said upper molding and said side moldings includes a leg portion adapted to be disposed outwardly of and along the peripheral upper edge and the peripheral side edges, respectively, of the windshield, and a head portion extending inwardly from said leg portion and being adapted to overlie the windshield;

wherein said head portions of said side moldings are greater in thickness than said head portion of said upper molding such that said head portions of said side moldings define a means for preventing sideways scattering of water incident on the windshield;

wherein the thickness of said head portions of said side moldings decreases gradually toward said upper molding; and wherein said head portions of said side moldings and said upper molding respectively have contacting undersurfaces adapted to contact an exterior surface of the windshield, said contacting undersurface of said head portion of said upper molding running continuous with said undersurfaces of said head portions of said side moldings so as to define a single continuous surface adapted to contact the exterior surface of the windshield.

2. An automobile windshield molding as recited in claim 1, wherein said head portions of said upper molding and said side moldings respectively include, at top ends thereof, groove lips projecting inwardly therefrom;

said groove lips of said side moldings respectively define upper walls of rainwater guide grooves to be formed between said groove lips of said side moldings and the windshield;

said rainwater guide grooves respectively defined beneath said groove lips of said side moldings are gradually narrowed toward said upper molding; and said groove lip of said upper molding has an undersurface which defines said contacting undersurface of said head portion of said upper molding, such that said groove lip of said upper molding is adapted to contact the windshield and such that said groove lip of said upper molding does not define an upper wall of a rainwater guide groove.

3. An automobile windshield molding as recited in claim 2, wherein said side moldings and said upper molding include holding lips projecting inwardly from lower portions of said leg portions and beneath said head portions, respectively, such that the windshield is adapted to be held between said holding lip and said head portion of each of said side moldings and said upper molding.

4. An automobile windshield molding as recited in claim 2, wherein said side moldings and said upper molding include clips mounted to outer portions thereof, respectively; and clip mating means are provided for removably engaging said clips and mounting said side moldings and said upper molding to the window frame.

5. An automobile windshield molding as recited in claim 1, wherein said side moldings and said upper molding include holding lips projecting inwardly from lower portions of said leg portions and beneath said head portions, respectively, such that the windshield is adapted to be held between said holding lip and said head portion of each of said side moldings and said upper molding.

6. An automobile windshield molding as recited in claim 1, wherein said side moldings and said upper molding include clips mounted to outer portions thereof, respectively; and clip mating means are provided for removably engaging said clips and mounting said side moldings and said upper molding to the window frame.

7. An apparatus comprising:

an automobile window frame;

an automobile windshield mounted in said window frame, a gap being formed between said window frame and said windshield; and an automobile windshield molding fitted in said gap and comprising side moldings fitted in said gap between said window frame and said windshield along opposing peripheral side edges of said windshield, an upper molding fitted in said gap between said window frame and said windshield along a peripheral upper edge of said windshield, said upper molding being monolithically and continuously formed with said side moldings, wherein each of said upper molding and said side moldings includes a leg portion adapted to be disposed outwardly of an along said peripheral upper edge and said peripheral side edges, respectively, of said windshield, and a head portion extending inwardly from said leg portion and overlying said windshield, wherein said head portions of said side moldings are greater in thickness than said head portion of said upper molding; such that said head portions of said side moldings define a means for preventing sideways scattering of water incident on the windshield, wherein the thickness of said head portions of said side moldings decreases gradually toward said upper molding, and wherein said head portions of said side moldings and said upper molding respectively have contacting undersurfaces contacting an exterior surface of said windshield, said contacting undersurface of said head portion of said upper molding running continuous with said undersurfaces of said head portions of said side moldings so as to define a single continuous surface contacting said exterior surface of said windshield.

8. An apparatus as recited in claim 7, wherein
said head portions of said upper molding and said side moldings respectively include, at top ends thereof, groove lips projecting inwardly therefrom;
said groove lips of said side moldings respectively define upper walls of rainwater guide grooves to be formed between said groove lips of said side moldings and the windshield;
said rainwater guide grooves respectively defined beneath said groove lips of said side moldings are gradually narrowed toward said upper molding; and
said groove lip of said upper molding has an undersurface which defines said contacting undersurface of said head portion of said upper molding, such that said groove lip of said upper molding contacts said windshield and such that said groove lip of said upper molding does not define an upper wall of a rainwater guide groove.

9. An apparatus as recited in claim 8, wherein
said side moldings and said upper molding include holding lips projecting inwardly from lower portions of said leg portions and beneath said head portions, respectively, such that said windshield is held between said holding lip and said head portion of each of said side moldings and said upper molding.

10. An apparatus as recited in claim 8, wherein
said side moldings and said upper molding include clips mounted to outer portions thereof, respectively; and
clip mating means are provided for removably engaging said clips and mounting said side moldings and said upper molding to the window frame.

11. An apparatus as recited in claim 7, wherein
said side moldings and said upper molding include holding lips projecting inwardly from lower portions of said leg portions and beneath said head portions, respectively, such that said windshield is held between said holding lip and said head portion of each of said side moldings and said upper molding.

12. An apparatus as recited in claim 7, wherein
said side moldings and said upper molding include clips mounted to outer portions thereof, respectively; and
clip mating means are provided for removably engaging said clips and mounting said side moldings and said upper molding to the window frame.

* * * * *